US012628203B2

(12) United States Patent
Wu et al.

(10) Patent No.: US 12,628,203 B2
(45) Date of Patent: May 12, 2026

(54) SIDELINK RESOURCE COLLISION HANDLING AND RESOURCE ALLOCATION THROUGH USER EQUIPMENT COORDINATION

(71) Applicant: Apple Inc., Cupertino, CA (US)

(72) Inventors: Zhibin Wu, Los Altos, CA (US); Adesh Kumar, San Jose, CA (US); Chunxuan Ye, San Diego, CA (US); Dawei Zhang, San Diego, CA (US); Fangli Xu, Beijing (CN); Haijing Hu, Beijing (CN); Naveen Kumar R. Palle Venkata, San Diego, CA (US); Sethuraman Gurumoorthy, San Jose, CA (US); Srirang A. Lovlekar, Cupertino, CA (US); Yuqin Chen, Shenzhen (CN)

(73) Assignee: Apple, Inc., Cupertino, CA (US)

( * ) Notice: Subject to any disclaimer, the term of this patent is extended or adjusted under 35 U.S.C. 154(b) by 540 days.

(21) Appl. No.: 17/438,851

(22) PCT Filed: Oct. 22, 2020

(86) PCT No.: PCT/CN2020/122773
§ 371 (c)(1),
(2) Date: Sep. 13, 2021

(87) PCT Pub. No.: WO2022/082587
PCT Pub. Date: Apr. 28, 2022

(65) Prior Publication Data
US 2022/0132575 A1     Apr. 28, 2022

(51) Int. Cl.
*H04W 74/0808*     (2024.01)
*H04W 72/04*     (2023.01)

(52) U.S. Cl.
CPC ....... *H04W 74/0825* (2013.01); *H04W 72/04* (2013.01)

(58) Field of Classification Search
CPC .......................... H04W 74/0825; H04W 72/04
See application file for complete search history.

(56) References Cited

U.S. PATENT DOCUMENTS

| | | | |
|---|---|---|---|
| 11,818,749 B2 * | 11/2023 | Ryu | H04W 72/566 |
| 2001/0056501 A1 * | 12/2001 | Law | H04M 1/72412 |
| | | | 709/248 |

(Continued)

FOREIGN PATENT DOCUMENTS

| | | |
|---|---|---|
| CN | 107925906 | 4/2018 |
| CN | 110351858 | 10/2019 |

(Continued)

OTHER PUBLICATIONS

International Search Report for PCT Patent Application No. PCT/CN2020/122773; mailed Jul. 7, 2021.

(Continued)

*Primary Examiner* — Rhonda L Murphy
(74) *Attorney, Agent, or Firm* — Kowert, Hood, Munyon, Rankin & Goetzel, P.C.

(57) ABSTRACT

A user equipment (UE) may detect a collision or interference issues of a second UE and transmit information regarding the detected collision to a base station. The second UE may not able to sense the channel on its own and thus may inadvertently use resources already reserved or in use by other UEs. The information regarding the detected collision may include layer-1 identifiers (L1 IDs) and/or layer-2 identifiers (L2 IDs) corresponding to the UE and/or the second UE as well as additional information corresponding to the resource collision. This information may be usable by the base station in determining that the base station has previously communicated with the second UE and may (Continued)

trigger a resource reselection by the second UE. The UE may receive sidelink communications on one or more reselected sidelink transmission resources from the second UE.

20 Claims, 7 Drawing Sheets

(56) References Cited

U.S. PATENT DOCUMENTS

| 2013/0272196 A1* | 10/2013 | Li | ............................ | H04W 4/50 |
| | | | | 370/328 |
| 2016/0143064 A1* | 5/2016 | Cho | .................. | H04W 74/0858 |
| | | | | 370/329 |
| 2019/0059115 A1* | 2/2019 | Uchiyama | ............. | H04W 92/18 |
| 2021/0136646 A1* | 5/2021 | Tseng | .................... | H04W 48/16 |
| 2022/0383750 A1* | 12/2022 | Sharma Banjade | ... | G08G 1/005 |
| 2023/0171625 A1* | 6/2023 | Ma | ........................ | H04W 72/56 |
| | | | | 370/252 |

FOREIGN PATENT DOCUMENTS

| CN | 110651511 | | 1/2020 |
| CN | 110692279 | | 1/2020 |
| CN | 111416700 | | 7/2020 |
| CN | 111565373 | | 8/2020 |
| CN | 111801908 | | 10/2020 |
| EP | 3439398 | A1 | 2/2019 |
| EP | 3550905 | A1 | 10/2019 |
| WO | 2017125037 | A1 | 7/2017 |
| WO | 2020092939 | A1 | 5/2020 |

OTHER PUBLICATIONS

Office Action for CN Patent Application No. 202080106523.8; Oct. 16, 2024.

Notification to Grant Patent Right for CN 202080106523.8; Sep. 24, 2025.

MediaTek Inc, "R1-1908398 MTK on sidelink mode 2 resource allocation" 3GPP TSG RAN WG1 Meeting #98 Aug. 26, 2019.

* cited by examiner

SIDELINK RESOURCE COLLISION HANDLING AND RESOURCE ALLOCATION THROUGH USER EQUIPMENT COORDINATION

PRIORITY CLAIM INFORMATION

This application is a national stage application of International Application No. PCT/CN2020/122773, filed on Oct. 22, 2020, titled "Sidelink Resource Collision Handling and Resource Allocation Through User Equipment Coordination", which is hereby incorporated by reference in its entirety. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to an apparatus, system, and method for detecting and reporting sidelink collision/interference issues on behalf of a user equipment via a base station and coordinating UE in order to provide improved sidelink resource allocation.

DESCRIPTION OF THE RELATED ART

Wireless communication systems are rapidly growing in usage. One recent development in cellular communications is referred to as sidelink communication, where two user equipment (UE) devices communicate with each other without an intervening base station. One proposed use of sidelink wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), and other wireless communications devices for various purposes, such as to coordinate traffic activity, facilitate autonomous driving, and perform collision avoidance.

The increased communication requirements of certain V2X systems may strain the power and resource capabilities of portable, battery-powered UE devices. In addition, some. UEs may lack sidelink receiving capabilities for communicating with other UEs or may experience interference from other UEs. This may result in increased resource collisions during sidelink communications and may further present decreased battery life, increased latency, and degraded communication issues. Accordingly, improvements in the field would be desirable.

Embodiments are presented herein of apparatuses, systems, and methods for detecting and reporting sidelink collision/interference issues on behalf of user equipment (UE) via a base station and coordinating UE in order to minimize resource collisions and provide improved sidelink resource allocation, as well as reduce latency and power consumption, and enhance reliability.

Some embodiments relate to a user equipment (UE), comprising at least one antenna, a radio operably coupled to the at least one antenna, and a processor operably coupled to the radio. The (first) UE may be further configured to detect sidelink collision/interference issues of another (second) UE and transmit information regarding the detected collision to a base station. The second UE may be a fully capable UE (capable of both sidelink transmit and receive) or may be a transmit only UE. The second UE may not be able to adequately sense the sidelink channel for available resources, due to various circumstances that may arise. In the case where the second UE is a transmit only UE, the second UE may not be able to sense the channel on its own and thus may inadvertently use resources already reserved or in use by other UEs.

The information regarding the detected collision may include address or identifier information sufficient for the base station to identify the second UE (the "culprit UE"), as well as additional information corresponding to the resource collision. For example, the address or identifier information may include layer-1 identifiers (L1 IDs) and/or layer-2 identifiers (L2 IDs) corresponding to the UE and/or the second UE. The information regarding the detected collision may be usable by the base station in determining that the base station has previously communicated with the second UE and may further cause the base station to trigger a resource reselection by the second UE. When the second UE receives new resources due to its reselection, the second UE may then begin transmitting using these resources. The first UE may then receive sidelink communications on one or more reselected sidelink transmission resources from the second UE.

In some aspects, the second UE may be a transmit-only UE and may be configured to periodically transmit sidelink communications indicating that it is a transmit-only UE. Moreover, in other aspects, the second UE may be further configured to operate as a mode-1 UE. Moreover, the second UE may be configured to transmit signaling to the base station, wherein the signaling at least partially comprises at least one layer-2 (L2) identifier OD).

Some embodiments may relate to a user equipment (UE) device having at least one antenna for performing wireless communications, a radio, and a processing element coupled to the radio. The UE may perform at least some of the methods described herein.

Some embodiments may relate to a baseband processor having processing circuitry configured to perform at least a portion or all of the above operations.

Some embodiments may relate to a base station having a plurality of antennas, a radio operably coupled to the plurality of antennas, and a processor operably coupled to the radio in which the base station may be configured to perform at least a portion or all of the above operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
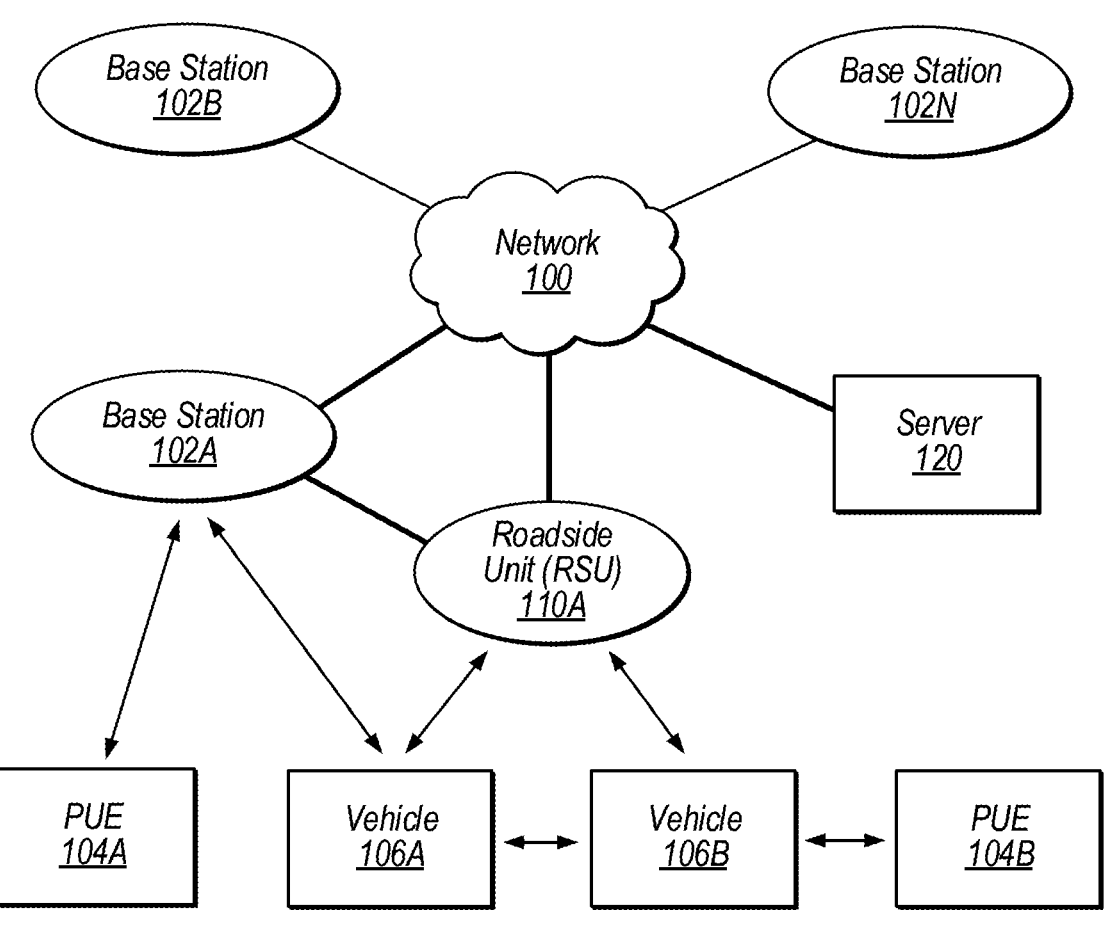
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UNITS: Universal Mobile Telecommunication System
LTE: Long Term Evolution
NR: New Radio
NR-U: NR Unlicensed
TX: Transmission/Transmit
RX: Reception/Receive
RAT: Radio Access Technology
DCI: Downlink Control Information
V2X: Vehicle to Everything
PSCCH: Physical Sidelink Control Channel
PSSCH: Physical Sidelink Shared Channel
PUCCH: Physical Uplink Control Channel
PUE: Pedestrian User Equipment
VUE: Vehicle User Equipment
SCI: Sidelink Control Information
TX-UE: Transmit Only User Equipment
VRU: Vulnerable Road User
SL: Sidelink
L1: Layer-1
L2: Layer-2
The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems devices which are mobile or portable and which perform wireless communications. Examples of UE devices include mobile telephones or smartphones (e.g., iPhone™, Android™-based phones), portable gaming devices (e.g., Nintendo DS™, PlayStation Portable™, Gameboy Advancer®, iPhone™), laptops, wearable devices (e.g. smartwatch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles. Examples of pedestrian UEs include smart phones, wearable UEs, PDAs, etc.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

FIG. 1—V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, and as defined above, the term "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing the wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V, HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

As shown, certain user devices may be able to conduct communications with one another directly, i.e., without an intermediary infrastructure device such as base station 102A or RSU 110A. As shown, vehicle 100A may conduct V2X-related communications directly with vehicle IMB. Similarly, the vehicle 106B may conduct V2X-related communications directly with PUE 104B. Such peer-to-peer communications may utilize a "sidelink" interface such as the PC5 interface in the case of some LTE and/or 5G NR embodiments. In some embodiments, the PC5 interface supports direct cellular communication between user devices (e.g., between vehicles 106), while the Uu interface supports cellular communications with infrastructure devices such as base stations. The PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. Some user devices in a V2X system, e.g., PUE 104A, may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and IOA.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5 NR, etc. Note that if the base station 102A is implemented in the context of LTE, it may alternately be referred to as an 'eNodeB', or eNB whereas if the base station 102A is implemented in the context of 5G NR, it may alternately be referred to as a 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may also be capable of communicating with the base station 102A. The user devices shown, i.e., user devices 104A, 104B, 106A, and 106B may also be capable of receiving signals from (and may possibly be within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are of course also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, 5G NR etc.), and/or other wireless communication protocols. In some embodiments, RSU 110A may be able to communicate with devices using a "sidelink" technology such as PC5.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
FIG. 2 illustrates a base station in communication with a user equipment (UE) device, according to some embodiments.

FIG. 2—Communication Between a UE and Base Station

FIG. 2 illustrates a user equipment (UE) device 104 (e.g., one of the PUEs 104A or 104B in FIG. 1) in communication with a base station 102 (e.g., the base station 102A in FIG. 1), according to some embodiments. The UE 104 may be a device with cellular communication capability such as a mobile phone, a hand-held device, a computer or a tablet, or virtually any type of portable wireless device.

The UE 104 may include a processor that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array) that is configured to perform any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (0×RTT/1×EV-DO/HRPD/eHRPD) LTE, and/or 5G NR using a single shared radio and/or 5G NR or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using any of LTE, 5G NR, and/or 1×RTT (or LTE or GSM), and separate radios for communicating using each of Wi-Fi and Bluetooth. Other configurations are also possible.

Figure 3:
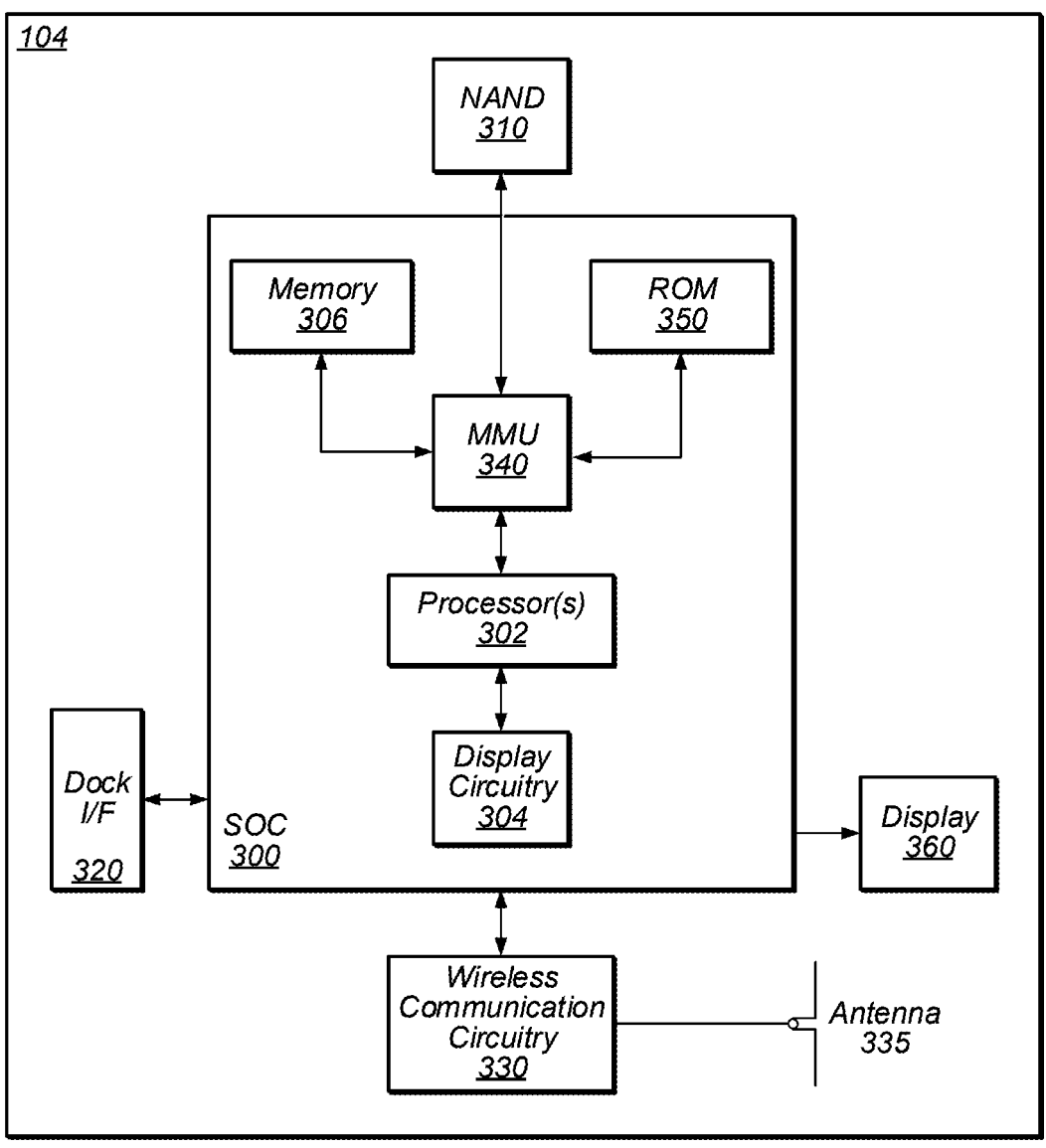
FIG. 3 is an example block diagram of a UE, according to some embodiments.

FIG. 3—UE Block Diagram

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing more efficient vehicle-related communication, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
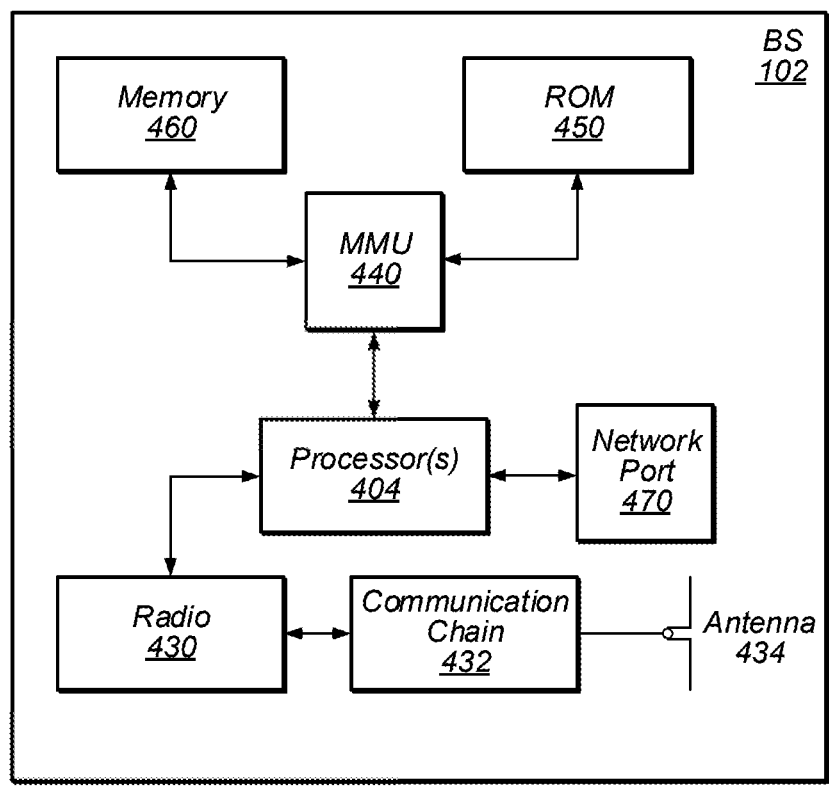
FIG. 4 is an example block diagram of a base station, according to some embodiments.

FIG. 4—Base Station Block Diagram

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another example, the base station 102 may include a 5G NR radio for performing communication according to 5G NR as well as a Wi-Fi radio for performing communication according to Wi-Fi. In such a case, the base station 102 may be capable of operating as both 5G NR base station and a Wi-Fi access point. As a further possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
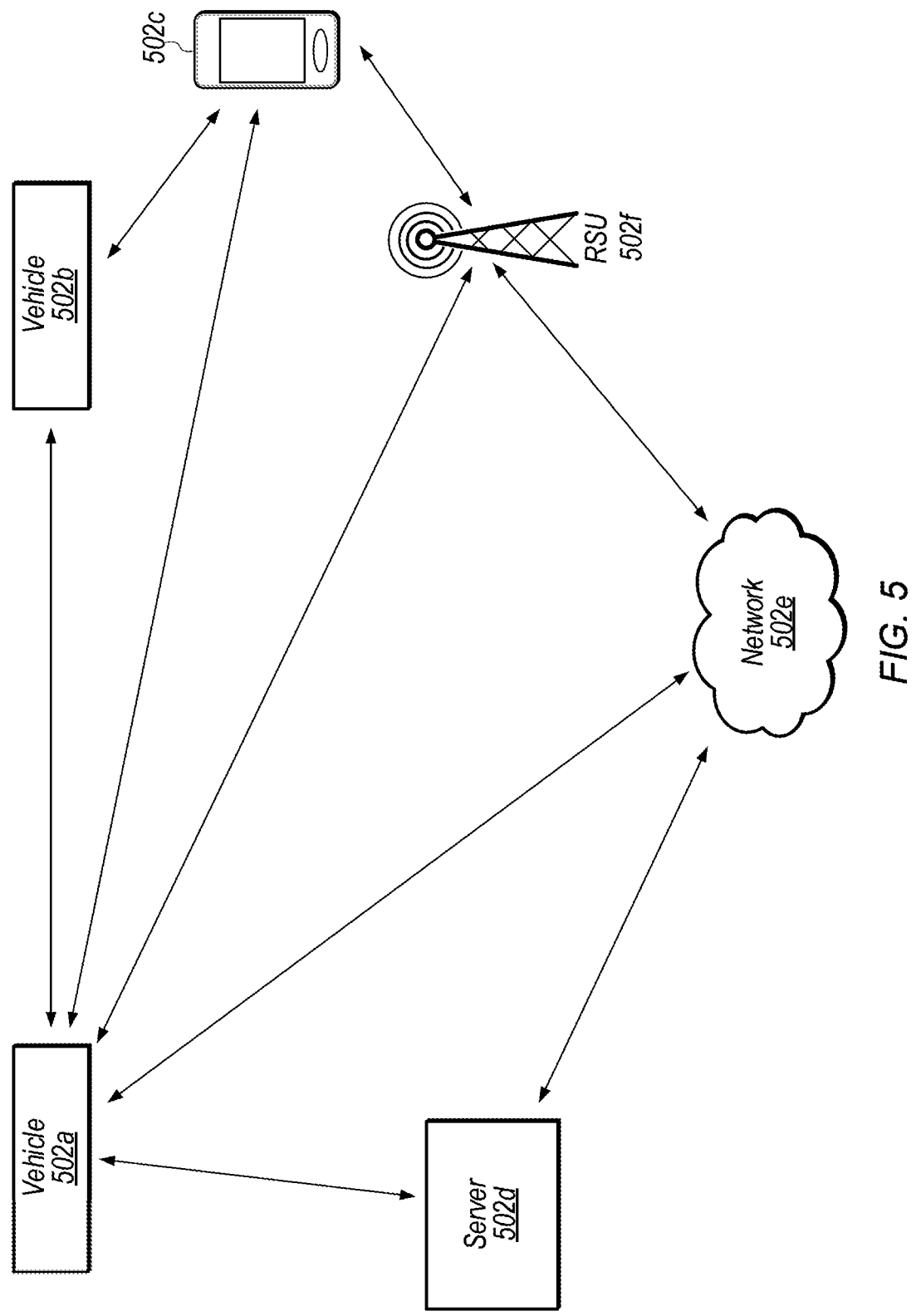
FIG. 5 illustrates an example of a vehicle-to-everything network, according to some embodiments.

FIG. 5—Sidelink Resource Management

As noted above, certain user devices (or UE devices) may be able to conduct communications with one another directly, i.e., without an intermediary infrastructure device such as base station 102A or RSU 110A. This direct communication between two wireless devices, such as between two vehicles, or between a vehicle UE and a pedestrian UE, is referred to as sidelink communication. Stated another way, two UE devices performing peer-to-peer (direct) communications with each other may each utilize a "sidelink" interface to communicate directly with each other and may be said to be communicating over a sidelink channel.

In some existing implementations, a listen before talk (LBT) mechanism may be used to access the shared medium during sidelink communications to avoid collisions and to improve medium utilization efficiency. However, LBT mechanisms are not collision free. In other words, LBT mechanisms cannot guarantee collision free transmissions. Here the term "collision" may refer to transmissions emanating from two or more wireless devices attempting to access the shared medium at approximately the same time. The shared medium may comprise unlicensed bands commonly used for Wi-Fi, Bluetooth, and other short to medium range communications, e.g., non-3GGP access.

In some implementations, in order to avoid collisions a transmitter may reserve periodic slots within a reservation period for communication. In such implementations, if collisions occur, the collisions could persist for at least a portion of the reservation period (and in a worst-case scenario, the duration of the reservation period) if the transmitter does not detect (or is unable to detect) the collisions.

As an example, vehicle-to-everything (V2X) communications, e.g., as specified by 3GPP TS 22.185 V.14.3.0, allows for communication between a vehicle (e.g., a mobile unit within a vehicle, such as a wireless device comprised within or currently contained within a vehicle and/or another transmitter contained or comprised with a vehicle) and various wireless devices. For example, as illustrated by FIG. 5, a vehicle, such as vehicle 502a, may communicate with various devices (e.g., devices 502b-f), such as road side units (RSUs), infrastructure (V2I), network (V2N), pedestrian (V2P), and/or other vehicles (V2V). In addition, as shown, various devices within the V2X framework may communicate with other devices. V2X communications may utilize both long range (e.g., cellular) communications as well as short to medium range communications (e.g., non-cellular). In some contemplated implementations, the non-cellular communications may use unlicensed bands as well as a dedicated spectrum at 5.9 GHz. Moreover, V2X communications may include uni-cast, multi-cast, groupcast, and/or broadcast communications. Each communication type may employ an LBT mechanism.

As described above, under the V2X communication protocol a transmitter may reserve periodic slots within a reservation period. More specifically, in order to help prevent collisions on the shared sidelink channel, the various UEs in a network (e.g., a V2X network) may perform sidelink resource management for both network assisted resource management and autonomous (e.g., non-network assisted) resource management. In other words, the various UE devices may operate to determine or schedule the use of sidelink resources for transmissions to other UEs. In some embodiments, a UE, such as UE 106, may originate a semi-persistent sidelink schedule for a resource. A UE may broadcast a resource occupancy message (RO message) periodically. The RO message may include resource blocks (RBs) and/or sub-frames to be used (scheduled), a periodicity of resource occupancy (e.g., reservation), and/or a time remaining for the resource occupancy (e.g., reservation). In addition, in some embodiments, a maximum allowed channel occupancy time (T max COT) may be defined. In such embodiments, an initial remaining time of the resource occupancy may not exceed the maximum allowed channel occupancy time. In other words, the resource occupancy may only be for a time less than the maximum allowed channel occupancy time.

In some embodiments, when a UE enters a new system (e.g., a new set of UEs and/or a new location), the UE may sense (listen) to a channel to collect existing UEs RO messages to determine available resources in the new system. In other words, prior to transmitting a RO message when entering a new set of UEs/area (e.g., a set of UEs with proximity for sidelink communications), the UE may determine available resources via reception of RO messages from neighboring UEs. In some embodiments, upon expiration of a resource occupancy, a UE, prior to transmitting a new RO message, may determine available resources via reception of RO messages from neighboring UEs.

In some existing implementations, 5G NR V2X may include various scheduling modes. For example, 5G NR V2X mode 2 may be designed for UE self-determination of sidelink transmission resources. 5G NR V2X mode 2 includes various sub-modes, including:

Mode 2(a) in which a user equipment device (UE) autonomously selects sidelink resources for transmission;

Mode 2(b) in which a UE assists sidelink resource selection for other UE(s);

Mode 2(c) in which a UE is configured with NR configured grants (e.g., network defined semi-persistent grants) for sidelink transmission; and Mode 2(d) in which a UE schedules sidelink transmissions of other UEs.

In addition, due to the periodic nature of V2X messaging, existing implementations of V2X may support semi-persistent scheduling (SPS), e.g., configured grant(s). For example, semi-persistent resources in SPS may represent timely repeated resources across a set of discontinuous sub-frames with a certain repetition periodicity. Semi-persistent resources may be scheduled across a set of discontinuous sub-frames with a sub-frame repetition period. Further, existing implementations of SPS (e.g., LTE V2X) and its corresponding resource allocation design are optimized for broadcast service. However, 5G NR V2X mode 2 additionally supports both unicast and groupcast services. Thus, there is a strong need to enhance methods that aid semi-persistent resource allocation for unicast service and groupcast service in 5G NR V2X mode 2.

In LTE V2X Rel-14, TX-UEs (UEs that are only configured to transmit in the sidelink channel, and which cannot receive in the sidelink channel) were supported by configuring the TX-UE to use mode 2 random resource selection or mode 1 (base station-controlled resource allocation). For NR V2X, the TX-UEs can still support broadcast and HARQ-disabled Groupcast. However, because these TX-UEs are unable to complete the PC5-RRC connection setup, there is no unicast support.

In NR V2X R16, both Mode 1 and Mode 2 resource allocation schemes may be supported. The Mode 2 resource allocation scheme may involve the transmitting UE selecting the sidelink transmission resources based on its own sensing and resource selection procedure. In Rel-17 sidelink enhancement, the objective is to specify resource allocation by introducing the principle of Rel-14 LTE sidelink random resource selection and partial sensing to Rel-16 NR sidelink resource allocation Mode 2.

As noted above, when using Mode 2, some UEs may need to periodically perform sensing operations on the sidelink channel with a relatively high frequency in order to identify and utilize the potential resources of other UEs for sidelink communication. Such active sensing may consume device resources, e.g., power, at a relatively high rate. However, the option to reduce the sensing operations to a state of partial sensing (such as the UE only monitoring a subset of the subframes it is receiving) still consumes energy. Even further, the option to perform no sensing (e.g. random resource selection) may have a high resource collision probability.

In some scenarios, resource allocation of pedestrian user equipment (PUE) or other power restricted UEs may be based on no sensing or partial sensing in which the resources may be randomly allocated. On the other hand, for less power restricted UEs such as vehicle user equipment (VUE), full sensing may be assumed. However, some lower cost PUEs may lack the capability to receive sidelink communications regarding resource allocation from less power restricted VUEs.

In moving from LTE V2X to NR V2X, one area that needs enhancement is in regard to resource allocation schemes for Transmit-only User Equipment (TX-UEs). Currently, most resource allocation enhancement work only focuses on mode-2b which does not include TX-UEs. More specifically, in regard to TX-UEs, neither mode 2b or 2d can be used and the TX-UE cannot be directly coordinated by another UE due to its potential lack of a sidelink receiver. This being the case, the TX-UEs may need to be coordinated via the Uu interface.

Figure 6:
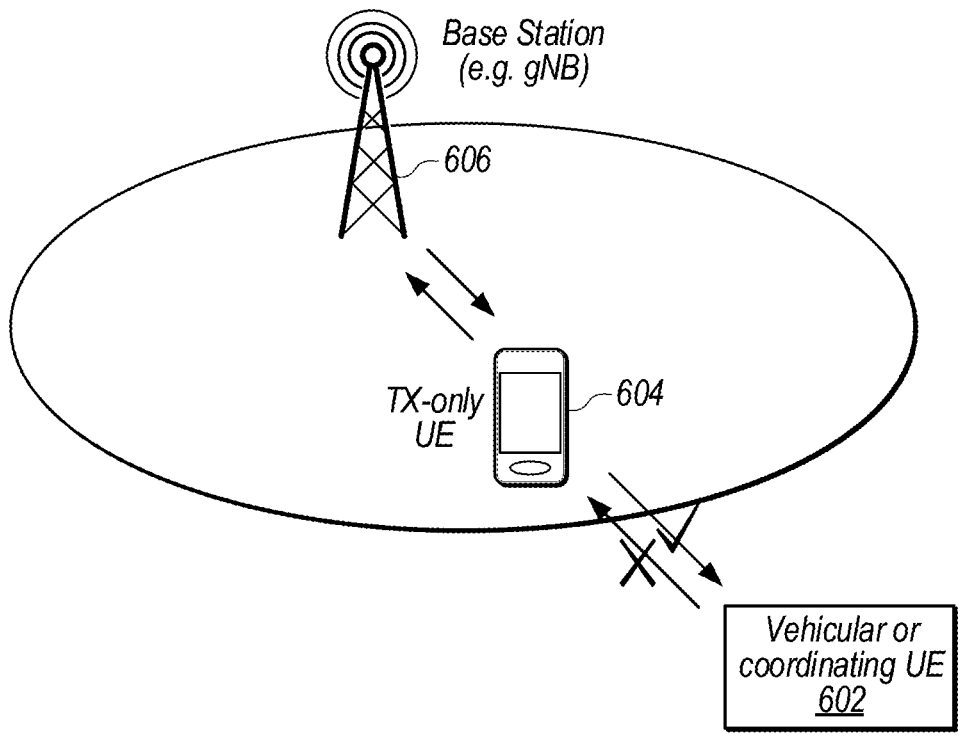
FIG. 6 illustrates a transmit-only UE operating in a V2X environment, according to some embodiments.

FIG. 6—Transmit-Only UE in a V2X Environment

As briefly mentioned above, some lower-cost UEs tend to have reduced complexity and may not include a receiver compatible with sidelink communications. Therefore, some UEs (typically PUEs) may only be able to transmit (in regard to sidelink communications) to other UEs (such as a VUE or other UEs) and may not be able to receive communications on the sidelink channel. UEs that are capable of transmitting on the sidelink channel but which lack the capability to receive on the sidelink channel are referred to as transmit-only UEs (TX-UEs). Note that transmit-only UEs are generally capable of performing both transmit and receive operations on the Uu interface with a cellular base station, but they are only configured to transmit on the sidelink channel and lack a sidelink receiver capability such that they cannot receive sidelink transmissions. Transmit-only UEs (TX-UEs) are an important aspect and demographic of Pedestrian UEs (PUEs) interacting with vehicle UEs (VUEs) in a V2X environment.

Because of this limitation, TX-UEs may proactively transmit sidelink communication signals to announce their presence in an attempt to alert other road users. On the other hand, by not performing any receiving operations regarding sidelink, the transmit-only UEs may experience the added benefit of enhanced power conservation. Additionally, if a receiving UE is aware that a transmit-only UE is communicating with it, it may also experience enhanced power conservation by not transmitting sidelink feedback communications to the transmit-only UE.

FIG. 6 illustrates a transmit-only user equipment in a V2X environment, according to some embodiments. For example, as shown in FIG. 6, the TX-only UE 604 is able to transmit sidelink communications to the vehicular or coordinating UE 602 but is unable to receive such sidelink communications from 602 due to the lack of sidelink receiving capability (i.e. lacking a sidelink receiver). The TX-UE is, however, able to receive and transmit signaling from/to the base station (e.g. gNB) 606. In some aspects, the TX-UE may transmit periodic sidelink messages identifying itself as a transmit-only UE. Consequently, the VUE or coordinating UE may be able to utilize this information in order to minimize or eliminate unnecessary transmissions to the transmit-only UE. As briefly mentioned above, this could potentially result in the VUE or coordinating UE experiencing power savings through not expending stored energy on these transmissions.

Figure 7A:
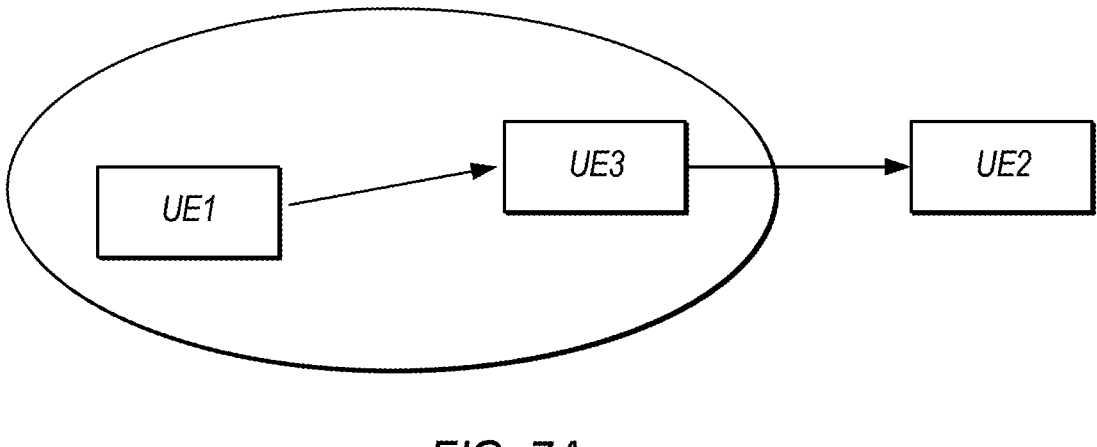
FIGS. 7A and 7B illustrate half-duplex and hidden-node resource collision issues, according to some embodiments.
Figure 7B:
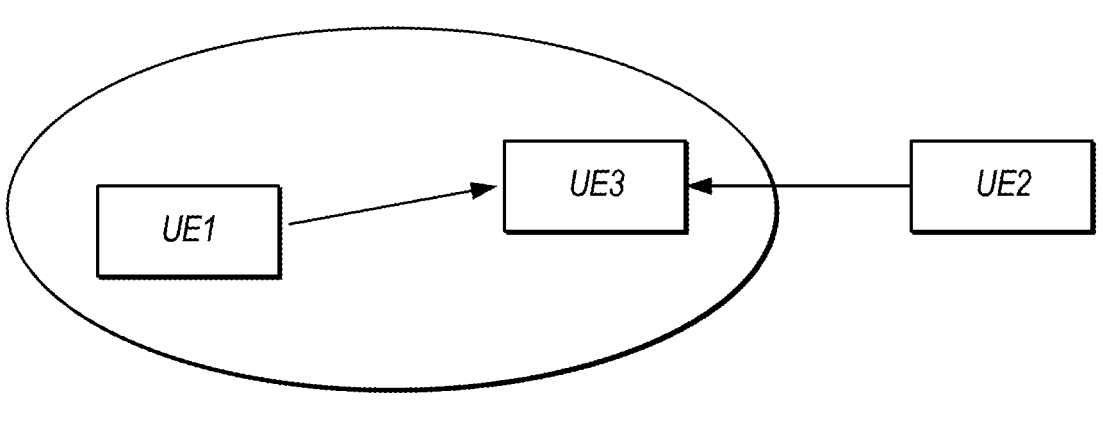

FIGS. 7A and 7B—Half-Duplex and Hidden-Node Resource Collision Issues

FIGS. 7A and 7B illustrate collision issues that can occur for a UE. The example collision scenarios in FIGS. 7A and 7B can occur with respect to any UE (e.g., a UE that is capable of both sidelink transmit and receive operations) and may not be limited to transmit-only UE operation as described above.

FIG. 7A illustrates the possibility of resource collisions due to the half-duplex operation of UE, according to some embodiments. In this example, the first UE (UE1) may be unable to decode sidelink control information (SCI) in the slots in which it is transmitting. In other words, UE1 may not be able to receive sidelink control information in slots in which it is attempting to send data. Thus, in effect UE1 may be unable to sense whether the slot used to transmit to UE3 is an appropriate slot. In other words, UE1 may not be aware of whether there will be a collision with the resources of UE3 because it cannot sense in that particular slot.

FIG. 7B illustrates another collision scenario referred to as the hidden-node issue. In this example, a transmitting UE1 may not be aware of the interference of another transmitting UE2 from its sensing information, due to the fact that UE2 is outside the coverage area of UE1. As shown, UE1 is transmitting a sidelink signal to UE3, where UE3 is sufficiently close in proximity to UE1 to be in UE1's coverage area. However, UE2 is outside of UE1's coverage area, and hence UE1 cannot sense transmissions that are performed by UE2. Thus, UE1 cannot detect the resources being used by UE2 for the purpose of collision avoidance. Consequently. UE3's reception of UE1's transmission may fail due to the interference from UE2, e.g., UE2 may be transmitting to UE3 in the same slot. In other words, UE2 may be using the same transmission resources in communicating to UE3 that UE1 is also attempting to use, and this may cause a collision of resources. Although the RAN1 (radio layer 1) full-sensing algorithm may allow for UE1 to change to another slot if resource re-selection is triggered, collisions may be persistent in the case of random-resource selection. This may be due to LTE-V2X requiring the UE to maintain the random-resource selection process for a certain time period. In other words, even when UEs are selecting resources at random, there is a chance for the collision of resources in transmission/reception. Thus, improvements in the field are desired.

Sidelink Resource Collision Handling and Resource Allocation Through User Equipment Coordination In some embodiments, a V2X environment may comprise a base station, a RX-UE (e.g. a VUE), and a second UE (e.g. a PUE). As used herein, the term "RX-UE" refers to a UE that is capable of both receiving and transmitting on the sidelink channel. The RX-UE and the second UE may be fully capable of receiving and transmitting sidelink communications. Alternatively, the second UE, in some aspects, may be a transmit-only UE (TX-UE) as described above. The second UE is sometimes referred to herein as the "culprit UE" as it is performing transmissions that result in collision/interference issues.

The RX-UE may detect that a collision has occurred or will occur due to transmissions made by the second UE (the culprit UE). These collisions may be due to the second UE being unable to adequately sense the sidelink channel.

Alternatively, or in addition, these collisions may result from the first UE being unable to decode data from the second UE's sidelink transmission. This inability of the RX-UE to decode this data could be due to a low SINR (Signal to Noise and Interference Ratio) after receiving sidelink control information (SCI) from the second UE. Because the second UE may be incapable of receiving resource allocation direction from the RX-UE (e.g. the second UE is a transmit-only UE or TX-UE), the RX-UE may then send a report to the base station (e.g. gNB) to inform the base station about the sender and/or receiver addresses as well as the problematic resource candidate. Alternatively, the second UE may be able to transmit and receive sidelink communications. Consequently, the RX-UE may then provide feedback transmissions directly to the second UE and/or may optionally send a report to the base station as described above.

In other embodiments, the RX-UE may send the report to the base station in response to the TX-UE sending a periodic sidelink message to the RX-UE identifying itself as a transmit only UE (i.e. lacking sidelink receiving capability). In some aspects, this report could also be sent by another coordinating UE which has detected the collision (i.e. a UE operating in mode 2d).

The base station may use this report to then verify or determine the addresses of the sender/receiver (as well as the problematic candidate resource) and match it to the second UE. Furthermore, the base station may be able to perform this verification based on the second UE having previously shared the intended sidelink transmission to the base station in an earlier RRC transmission. In this RRC transmission, the second UE may have identified all possible destination IDs that to which it was attempting to transmit. Next, the base station may send an RRCReconfigure message to the second UE to trigger it to perform resource re-selection.

During operation, a first UE (e.g. a VUE) may receive signaling from a second UE. In some instances, the second UE may be a transmit only-UE (TX-UE). As noted above, when the VUE determines that it is communicating with a second UE and/or detects a collision of resources from an attempted transmission, the VUE (or other coordinating UE) may perform additional steps to avoid potential future resource collisions with the second UE. In some aspects, the UE may report the addresses and in-conflict resources to a base station. The base station may then utilize this report to verify the second UE's identity as well as the candidate resources in-conflict. In other words, given the presence of a transmit-only UE (second UE), the first UE or other coordinating UE may perform additional steps to decrease the likelihood of resource conflicts.

Accordingly, embodiments described herein contemplate a second UE (e.g. a PUE), attempting to perform sidelink communications with a first UE (a VUE for example), where the first UE forwards information regarding the resources in conflict as well as identifiers of the parties involved to a base station. The base station may use this information as a means of triggering the second UE to perform resource re-selection of appropriate sidelink transmission resources. In some instances, the second UE may be fully capable of transmitting and receiving sidelink communications. In other instances, the second UE may be a transmit-only UE (TX-UE) which may not be able to receive sidelink communications.

Figure 8:
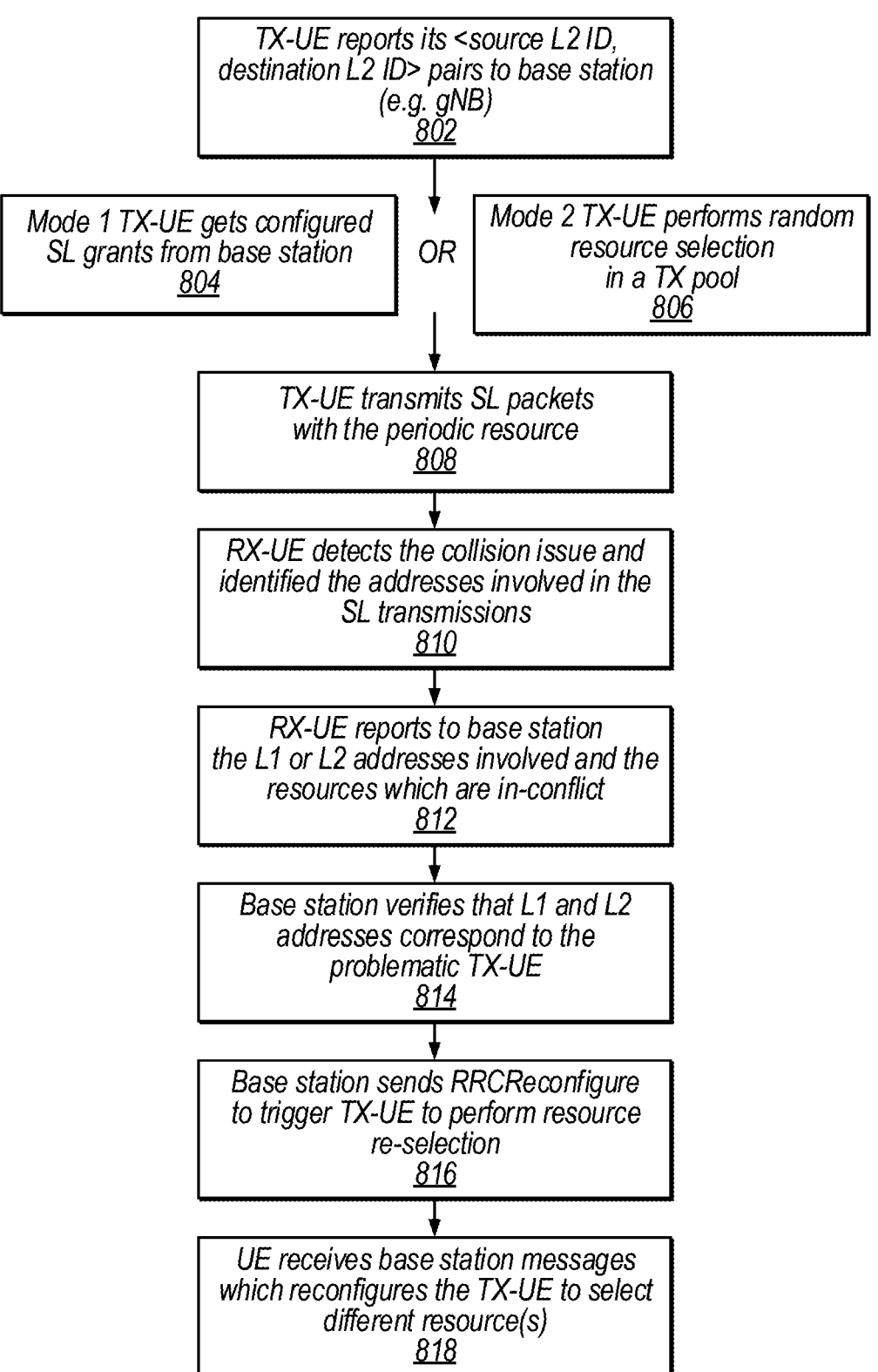
FIG. 8 is a flowchart diagram illustrating inter-UE coordination for resource collision avoidance and resource allocation via a base station, according to some embodiments.

FIG. 8—Inter-UE Coordination and Resource Collision Avoidance and Resource Allocation Via a Base Station FIG. 8 displays inter-UE coordination and resource collision avoidance and resource allocation via a base station, according to some embodiments.

First, in step 802, a second UE (e.g. a TX-UE) may report addressing or identifier information to the base station that can be used later by the base station when a collision is reported for proper base station handling of the collision and resource reselection triggering. For example, the second UE may report its <source L2 ID, destination L2 ID> pairs to the base station (e.g. gNB). In other words, the second UE connected to a base station may report its own L2 (source) address(es) to the base station. Additionally, this report may contain information regarding the intended sidelink transmission and may further disclose all possible destination L2 IDs that the second UE was attempting to transmit to. In doing so, the base station may be able to later utilize this information in determining/handling any potential resource conflicts associated with that particular second UE. Furthermore, this information may also to assisting the base station in understanding and evaluating unicast peers as well as matching or checking the second UE's or other UEs' sidelink capabilities.

For example, in the scenario of a UE receiving a transport block (TB) from another UE (via PSSCH for example), in order to perform feedback transmissions, the receiving UE Thus, the base station may be able to exactly match the second UE based on the information provided by both the second UE and RX-UE.

However, an issue may arise in an example scenario in which the RX-UE is not able to decode the MAC header of the transmission from the second UE. In this case, the RX-UE may only report the L1 ID of the source UE (i.e. a TX-UE). However, if the second UE reports its L2 ID in the SidelinkUEInformation to the base station (which is not currently supported in 3GPP Rel-16), then the base station (e.g. gNB) may be able to match the detected 8-bit with the 8-bit out of the known 24-bit address of the second UE. Furthermore, if the second UE is a mode 1 UE, the reported "collision" resource may also help the base station identify which UE has caused the resource collision issue.

Additionally, in moving from LTE V2X to NR V2X, a sidelink capable second UE may not disclose the source L2 address to the serving base station. More specifically, the second UE may report the transmission destination address (es), but not its own address used for RX operation. This being the case, in 3GPP Rel-16 for example, a base station may be unable to link Uu addresses and sidelink addresses. SidelinkUEInformationNR Excerpt:

| SidelinkUEInformationNR-r16-IEs ::= | SEQUENCE { | |
|---|---|---|
| sl-RxInterestedFreqList-r16 | SL-InterestedFreqList-r16 | OPTIONAL |
| sl-TxResourceReqList-r16 | SL-TxResourceRegList-r16 | OPTIONAL |
| sl-FailureList-r16 | SL-FailureList-r16 | OPTIONAL |
| lateNonCriticalExtension | OCTET STRING | OPTIONAL |
| nonCriticalExtention | SEQUENCE { } | OPTIONAL |
| } | | |
| SL-InterestedFreqList-r16 ::= | SEQUENCE (SIZE (1..maxNrofFreqSL-r16)) OF INTEGER | |
| (1..maxNrofFreqSL-r16) | | |
| SL-TxResourceRegList-r16 ::= | SEQUENCE (SIZE (1..maxNrofSL-Dest-r16)) OF SL- | |
| TxResourceReq-r16 | | |
| SL-TxResourceReq-r16 ::= | SEQUENCE { | |
| sl-DestinationIdentity-r16 | SL-DestinationIdentity-r16, | |
| sl-CastType-r16 | ENUMERATED {broadcast, groupcast, unicast, | |
| spare1}, | | |
| sl-RLC-ModeIndicationList-r16 | SEQUENCE (SIZE (1..maxNrofSLRB-r16)) OF | |
| SL-RLC-ModeIndication-r16 | OPTIONAL | |
| sl-QoS-InfoList-r16 | SEQUENCE (SIZE (1..maxNrofSL-QFIsPerDest-r16)) OF | |
| SL-QOS-Info-r16OPTIONAL | | |
| sl-TypeTxSyncList-r16 | SEQUENCE (SIZE (1..maxNrofFreqSL-r16)) OF SL- | |
| TypeTxSync-r16 OPTIONAL | | |
| sl-TxInterestedFreqList-r16 | SL-TxInterestedFreqList-r16 | OPTIONAL |
| sl-CapabilityInformationSidelink-r16 | OCTET STRING | OPTIONAL | may need to know the identity of the UE that transmitted the TB. Accordingly, when the UE transmits the TB to a receiving UE, an 8-bit source identity (ID) and a 16-bit destination ID are transmitted through SC stage 2. To avoid collisions, resources for transmissions can be determined by the source ID by utilizing the information conveyed by the SCI stage 2.

More specifically, layer-1 (L1) IDs have incomplete address information conveyed in sidelink control information (SCI). For example, an L1 source ID is 8 bits of a 24-bit Layer 2 (L2) ID and an L1 destination ID is 16 bits of a 24-bit L2 ID. In the example of base station and inter-UE coordination, the addresses can be compared by the RX-UE (e.g. the victim of hidden node or half-duplex issue) by reporting its own L2 ID (Destination ID) to the base station. Additionally, when the second UE initially sends SidelinkUEInformation to the base station, it has indicated all of its intended destinations (including the address of the RX-UE). The base station (e.g. gNB) may then be able to verify or determine which other UE included the RX-UE address in its previous SidelinkUEInformation or RRC message.

In the above excerpt, the TX-UE may only include the field "sl-Destinationidentity-r16" in its report to the base station (e.g. gNB). This report may include one or multiple Destination Layer 2 addresses, but may lack source Layer-2 addresses to be used by the TX-UE in its intended sidelink transmissions.

It is noted that the base station may allocate a RNTI (radio network temporary identifier) used in the Uu interface (not in PC5) to the second UE as a way to identify the second UE for future RRC messaging or triggering purposes. The base station may also allocate another sidelink RNTI to the second UE. However, neither RNTI may be used in a PC5 interface and rather is used for the UEs to monitor PDCCH (Physical Downlink Control Channel) for Uu or SL grants allocated by the base station. Therefore, in order to rectify this, the TX-UE is proposed to report both source L2 ID and destination L2 ID as a pair to the base station.

After reporting its <source L2 ID, destination L2 ID> pairs to the base station, the second UE may proceed from step 802 to either step 804 (corresponding to a Mode 1 UE) or alternatively to step 806 (corresponding to a Mode 2 UE).

In step 804, the Mode 1 UE (the second UE) may receive configured sidelink (SL) grants from the base station. In other words, the base station may at least partially coordinate the resource allocation for the second UE. However, in this case of mode 1 UEs which utilize base station-scheduled resources, this resource allocation method is not 100% collision free. For instance, a base station (e.g. gNB) may use a dedicated resource pool for mode 1. Alternatively, the base station may use a mode 1-mode 2 mixed resource pool. Even in the case of the dedicated pool, however, the hidden terminal issue (as discussed above with regard to FIG. 7) still exists in the form of an interfering UE from a neighboring cell or out of coverage area. Moreover, half-duplex and hidden-node issues can occur in the scenario of two mode-1 UEs connected to two separate base stations.

In regard to the mode 1 UE sensing report in LTE-V2X R15, mode3 and/or mode4 resource pool sharing is supported by enabling mode 3 UEs to report sensing results to the base station (e.g. an eNB). For NR V2X, although mode 1 UEs may reuse the LTE R15 baseline, sensing results (e.g. a list of good resource candidates) may not specifically enable the base station (e.g. gNB) to rectify a specific UE's resource collision issue. However, this may be solved by allowing the UE to provide more accurate reports of errors (to include <SL address, SL resource, error-level> for instance) which may further allow the base station to trigger the second UE to perform resource reselection. Furthermore, in regard to the scenario involving the future studies and impacts of RAN3 (radio access network 3) and in which the RX-UE and the second UE were in different cells, then inter-base station and UE coordination may be necessary.

Alternatively, in step 806, the Mode 2 UE (the second UE) may perform random resource selection from a transmit resource pool. In other words, because the second UE may be incapable of receiving feedback from the RX-UE (e.g. it may be a TX-UE) to possibly indicate a resource conflict, the second UE may randomly select a resource with which to transmit sidelink communications to the RX-UE. Due to the fact that the resource has been randomly selected, there remains a possibility of a resource collision in the transmission between the second UE and the RX-UE.

Proceeding to step 808 from either step 806 (Mode 2) or step 804 (Mode 1), the second UE may transmit sidelink (SL) packets with a periodic or randomly selected resource. In other words, the second UE (e.g. a PUE) may attempt to transmit SL packets to a receiving UE (RX-UE) in order to convey sidelink information to the RX-UE (e.g. a VUE or coordinating UE). In other aspects, the second UE may also indicate its "no RX" status in periodic SL messages if it is a TX-UE. In other words, the second LIE (which in some instances may be a TX-UE) may broadcast a SL message to one or more UEs that it has no sidelink receiving capability. When the RX-UE receives such a periodic message from the second LE, the RX-UE or another coordinating UE may adjust its own resource selection or attempt to use base station coordination rather than sending a coordination message back to the second UE (which would be ineffective due to the TX-UEs inherent lack of a SL receiver). Additionally, as mentioned above, this potential decision to forego sidelink feedback communications with the TX-UE may result in power savings for the RX-UE.

Accordingly, the RX-UE may detect a collision issue in step 810. In other words, the RX-UE may detect that two or more other UEs are transmitting on the same resource at the same time. The RX-UE may be able to detect the collision by being unable to decode data from the received sidelink control information (SCI) due to a low SINR (signal to noise and interference ratio), Consequently, the RX-UE may then identify or determine the addresses involved with this defective sidelink transmission. For example, as discussed above with regard to step 802, the RX-UE may not be able to decode the MAC header of the transmission from the second UE in which case the RX-UE may only be able to report the L1 ID of the source UE (i.e. the second UE). Alternatively, the RX-UE (e.g. the victim of hidden node or half-duplex issue) may report its own L2 ID (Source ID) to the base station.

However, having determined the culprit collision resource and address(es) of the second UE, in step 812 the RX-UE may then report the L1 or L2 addresses and resources in-conflict to the base station. Moreover, the RX-UE may also report a resource failure or collision issue to the base station. In some aspects, this report may be a specific, event-triggered report (i.e. triggered by the determination of a resource collision) rather than a general report of the "health" or "usage map" of a resource pool. Additionally, this report may include the involved L1 ID(s) and the problematic resource(s). Moreover, this sidelink measurement report may be re-used or define a new Uu RRC message to be used by the base station to properly allocate sidelink transmission resources to the second UE.

In step 814, the base station may then determine or verify that the L1 and L2 addresses correspond to the problematic second UE. For example, as briefly discussed in regard to step 802, the base station may compare the L2 source ID (from the RX-UE) to the L2 Destination ID provided by the second UE to the base station initially. Accordingly, the base station (e.g. gNB) can verify or determine which TX-UE included the RX-UE address in its earlier SidelinktUEInformation or RRC message. Thus, the base station may be able to exactly match the second UE based on the information provided by both the second UE and RX-UE.

Proceeding to step 816, the base station may then, having identified the culprit UE, send a RRCReconfigure transmission to the second LIE (the culprit UE) in an attempt to trigger the second UE to perform resource re-selection. In other words, the base station may transmit signaling to the second UE providing instructions for re-selecting appropriate sidelink transmission resources with which to utilize in additional sidelink transmissions to the RX-UE. Furthermore, the RRCReconfigure message for sidelink may be enhanced to allow mode 2 resource re-selection to be triggered. In some embodiments, the RRCReconfigure could indicate resource re-selection in the form of a one-bit flag (per UE or per-pool configuration). Alternatively, in other aspects, a fallback solution may involve the base station (e.g. gNB) reconfiguring a mode 2 pool and optionally excluding the problematic resource. This RRC pool reconfiguration may serve as a valid resource selection trigger.

Lastly, in step 818, the second LIE may receive the RRCReconfigure messaging from the base station. As described above, this RRCReconfigure message may direct the second UE to select one or more different resources due to the detected collision with the RX-UE. In other words, the second UE may perform resource re-selection operations based at least in part in response to receiving trigger signaling from the base station. This may cause the second UE to select a new set of transmission resources that do not cause the same type of collision/interference that previously occurred. In performing resource reselection based on this messaging provided by the base station, the second LIE may avoid resource collisions in future attempts to perform sidelink transmissions to the RX-UE. Thus, the second LIE may then attempt to transmit sidelink communications to the RX-UE using these one or more reselected sidelink transmission resources, and with reduce collision/interference issues.

As briefly mentioned above, this procedure involving steps 802-804 and 808-818 may be applied to Mode 1 UEs. For example, as illustrated in FIG. 8, UEs may either be mode 1 or mode 2 and may proceed from step 804 to 808 and complete steps through 818 as a mode 1 UE. For example, in some embodiments, a mode 1 UE may receive a new sidelink grant from the base station (e.g. in step 816) in a PDCCH channel (physical downlink control channel) which allocates one or more sidelink transmission resources to be used in PC5 interface. Additionally, or alternatively, in step 816, the mode 1 UE may be given a newly configured sidelink grant in a RRC (Radio Resource Control) message. Proceeding to step 818, the mode 1 UE may then simply utilize the new resource(s) reconfigured by the base station, rather than re-selecting a resource from the configured resource pool.

In summary and with further respect to FIG. 8, the procedure and steps described above illustrate the example of a second UE attempting communications with a RX-UE. The RX-UE may detect a collision in the attempted communications and optionally transmit collision related information (including resource collision information and address information) to a base station. The base station may then use the information provided by the RX-UE and information previously provided to the base station by the second UE (when it attempted communications with the RX-UE) in order to identify the second UE and potentially trigger resource re-selection of the second UE due to the resource collision. As previously mentioned, in this example the RX-UE may be fully capable of receiving and transmitting sidelink communications. Moreover, the second UE may also be fully capable of receiving and transmitting sidelink communications. However, in a very relevant case, the second UE may be a transmit-only UE which due to its sensing and sidelink resource allocation limitations, enlists the support of the RX-UE (or other coordinating UE) and a base station in order to avoid potential resource collisions in sidelink transmissions between the second UE and the RX-UE.

According to some embodiments, a user equipment (UE), comprising at least one antenna, a radio operably coupled to the at least one antenna, and a processor operably coupled to the radio may be configured to determine information in response to receiving sidelink control information (SCI) from a second UE. The UE may be further configured transmit the information to a base station which may be used by the base station in determining an address of the second UE and one or more sidelink transmission resources for use by the second UE on a sidelink channel. Finally, the UE may receive sidelink communications on the one or more determined sidelink transmission resources from the second UE.

Further embodiments of the invention are described below in the following paragraphs:

Some embodiments may relate to a user equipment (UE) device having at least one antenna for performing wireless communications, a radio, and a processing element coupled to the radio. The UE may perform at least some of the methods described herein.

Some embodiments may relate to a baseband processor having processing circuitry configured to perform at least a portion or all of the above operations.

Some embodiments may relate to a base station configured to perform at least a portion or all of the above operations.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

In some embodiments, a cellular base station or baseband processor (which may be part of a cellular base station) may be configured to receive information regarding one or more transmissions from a first user equipment (UE) and receive additional information regarding a detected collision from a second UE. Additionally or alternatively, the base station and/or baseband processor may be configured to determine the identity of the first UE based at least in part on the received information from the first and second UEs and further transmit signaling to the first UE to direct the first UE to discontinue usage of sidelink resources which caused the collision. In some embodiments, the signaling may be based at least in part in response to determining the identity of the first UE. In some embodiments, the signaling may at least partially comprise a one-bit flag. In some embodiments, the cellular base station and/or baseband processor may be configured to compare 8-bit L1 IDs with 24-bit L2 IDs. Additionally or alternatively, the base station and/or baseband processor may be further configured to transmit signaling to the first UE to trigger a resource reselection via the Uu interface. In some embodiments, the base station and/or baseband processor may be further configured to re-configure a mode-2 resource pool based at least in part in response to receiving the additional information regarding the detected collision.

In some embodiments, a user equipment (UE) may be configured to transmit first information to a base station in a radio resource control (RRC) message, wherein the first information may be usable by the base station in identifying the UE from reported sidelink measurements or events. The UE may be further configured to transmit sidelink signaling on a sidelink channel, wherein the sidelink signaling may trigger another UE to record sidelink measurements or events, including the addresses used by the UE for the sidelink transmission, according to some embodiments. Additionally or alternatively, the UE may be configured to receive RRC messaging from the base station to instruct the UE to use one or more additional resources for one or more additional sidelink transmissions, wherein the RRC message to instruct the UE may be based at least in part on a notification of the measurement report received by the base station and also may be based at least in part on the first information usable by the base station in identifying the UE.

In some embodiments, the UE may be capable of transmitting sidelink signals and may not be capable of receiving sidelink signals. Additionally or alternatively, the UE may periodically transmit sidelink messaging identifying itself as a transmit-only UE. In some embodiments, the first information may at least partially comprise at least one layer-2 identifier (L2 ID) corresponding to the UE. Additionally or alternatively, the first information may be further usable by the base station in evaluating unicast peers of the UE or sidelink capabilities of other UEs.

What is claimed is:

1. An apparatus, comprising:
a memory: and
at least one processor in communication with the memory and configured to cause a user equipment (UE) to:
    receive, from a second UE, a periodic sidelink message identifying the second UE as a transmit only UE that is not capable of receiving sidelink transmissions and performing sidelink channel sensing;
    detect a collision of one or more resources resulting from one or more sidelink transmissions of the second UE; and
    transmit information regarding the detected collision to a base station, wherein the information regarding the detected collision includes at least one identifier of the UE and at least one identifier of the second UE, and wherein the at least one identifier of the UE and the at least one identifier of the second UE are useable by the base station to verify that the second UE caused the collision and to cause the base station to reconfigure the second UE to discontinue using sidelink resources which caused the collision.

2. The apparatus of claim 1,
wherein the information regarding the detected collision is configured to cause the base station to reconfigure the second UE to use one or more additional sidelink resources in place of the sidelink resources which caused the collision.

3. The apparatus of claim 2,
wherein the information regarding the detected collision at least partially comprises one or more layer-2 identifiers (L2 IDs) of intended transmissions.

4. The apparatus of claim 1,
wherein the information regarding the detected collision is configured to cause the base station to trigger the second UE to perform a sidelink resource reselection.

5. The apparatus of claim 1,
wherein the information regarding the detected collision is further configured to cause the base station to re-configure a mode-2 resource pool.

6. The apparatus of claim 1,
wherein the information regarding the detected collision is further configured to cause the base station to trigger the second UE to use one or more additional sidelink resources in place of the sidelink resources which caused the collision.

7. The apparatus of claim 1,
wherein the periodic sidelink message comprises a physical sidelink control channel (PSCCH) transmission including a capability field or flag indicating a transmit-only capability of the second UE.

8. The apparatus of claim 7,
wherein the periodic sidelink message further comprises a Layer-2 identifier of the second UE.

9. The apparatus of claim 1,
wherein a periodicity of the sidelink message identifying the second UE as a transmit-only UE is based on at least one of a mobility state of the second UE, a detected collision density, or a power-saving configuration of the second UE.

10. A wireless device, comprising:
wireless communication circuitry; and
at least one processor coupled to the wireless communication circuitry and configured to cause the wireless device to:
    receive, from a second wireless device, a periodic sidelink message identifying the second wireless device as a transmit only wireless device that is not capable of receiving sidelink transmissions and performing sidelink channel sensing;
    detect a collision of one or more resources resulting from one or more sidelink transmissions of the second wireless device; and
transmit information regarding the detected collision to a base station, wherein the information regarding the detected collision includes at least one identifier of the wireless device and at least one identifier of the second wireless device, and wherein the at least one identifier of the wireless device and the at least one identifier of the second wireless device are useable by the base station to verify that the second wireless device caused the collision and to cause the base station to reconfigure the second wireless device to discontinue using sidelink resources which caused the collision.

11. The wireless device of claim 10,
wherein the information regarding the detected collision is further configured to cause the base station to trigger the second wireless device to perform a sidelink resource reselection.

12. The wireless device of claim 10,
wherein the information regarding the detected collision is further configured to cause the base station to re-configure a mode-2 resource pool.

13. The wireless device of claim 10,
wherein the information regarding the detected collision is further configured to cause the base station to trigger the second wireless device to use one or more additional sidelink resources in place of the sidelink resources which caused the collision.

14. The wireless device of claim 10,
wherein the information regarding the detected collision at least partially comprises one or more layer-2 identifiers (L2 IDs) of intended transmissions.

15. An apparatus, comprising:

a memory; and at least one processor in communication with the memory and configured to cause a cellular base station to:

receive information regarding one or more transmissions from a first user equipment (UE) that periodically transmits a sidelink message identifying itself as a transmit only UE that is not capable of receiving sidelink transmissions and performing sidelink channel sensing;

receive additional information regarding a detected collision from a second UE,;

wherein the additional information regarding the detected collision including at least one identifier of the first UE and at least one identifier of the second UE useable by the cellular base station to verify that the first UE caused the collision;

determine the identity of the first UE based at least in part on the received information from the first UE and the received additional information from the second UE; and transmit, based at least in part in response to determining the identity of the first UE, signaling to the first UE to direct the first UE to discontinue usage of sidelink resources which caused the collision.

16. The apparatus of claim 15, wherein the signaling is configured to cause the cellular base station to reconfigure the first UE to use one or more additional sidelink resources in place of the sidelink resources which caused the collision.

17. The apparatus of claim 15, wherein the signaling is configured to cause the cellular base station to trigger the first UE to perform a sidelink resource reselection.

18. The apparatus of claim 15, wherein the information received from first UE at least partially comprises one or more layer-2 identifiers (L2 IDs) of intended transmissions.

19. The apparatus of claim 15, wherein the cellular base station is further configured to re-configure a mode-2 resource pool based at least in part on receiving the additional information regarding the detected collision.

20. The apparatus of claim 15, wherein the at least one processor is further configured to cause the cellular base station to:

transmit, to the first UE, an acknowledgement that indicates that the first UE's capability as a transmit only UE has been registered and instructs the first UE to reduce or suspend transmission of the periodic sidelink message.

\* \* \* \* \*